Figure 4:
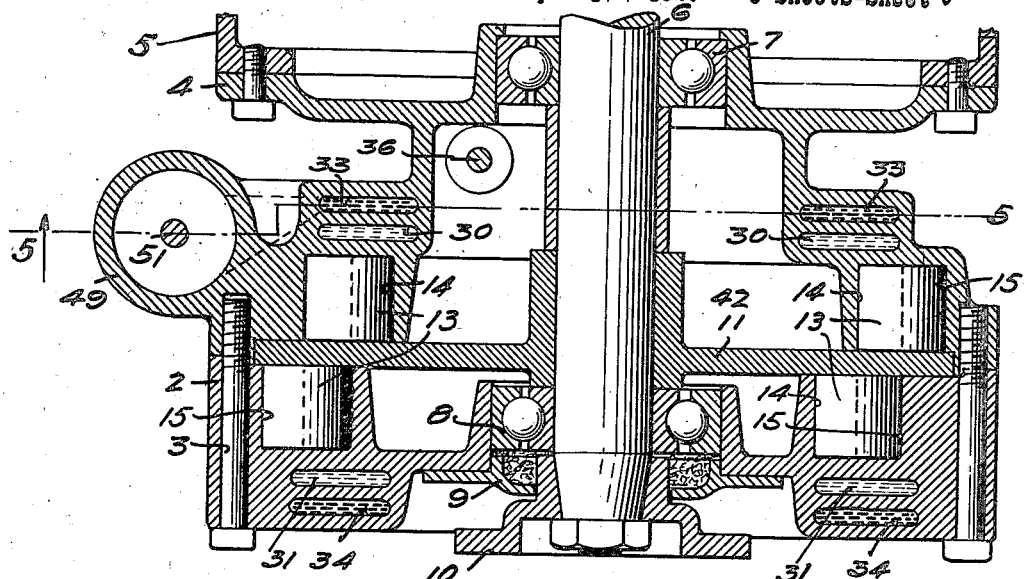

Nov. 11, 1924.
E. G. STAUDE
1,514,804
FLUID ACTUATED BRAKE FOR MOTOR VEHICLES
Original Filed Sept. 17 1920   3 Sheets-Sheet 1
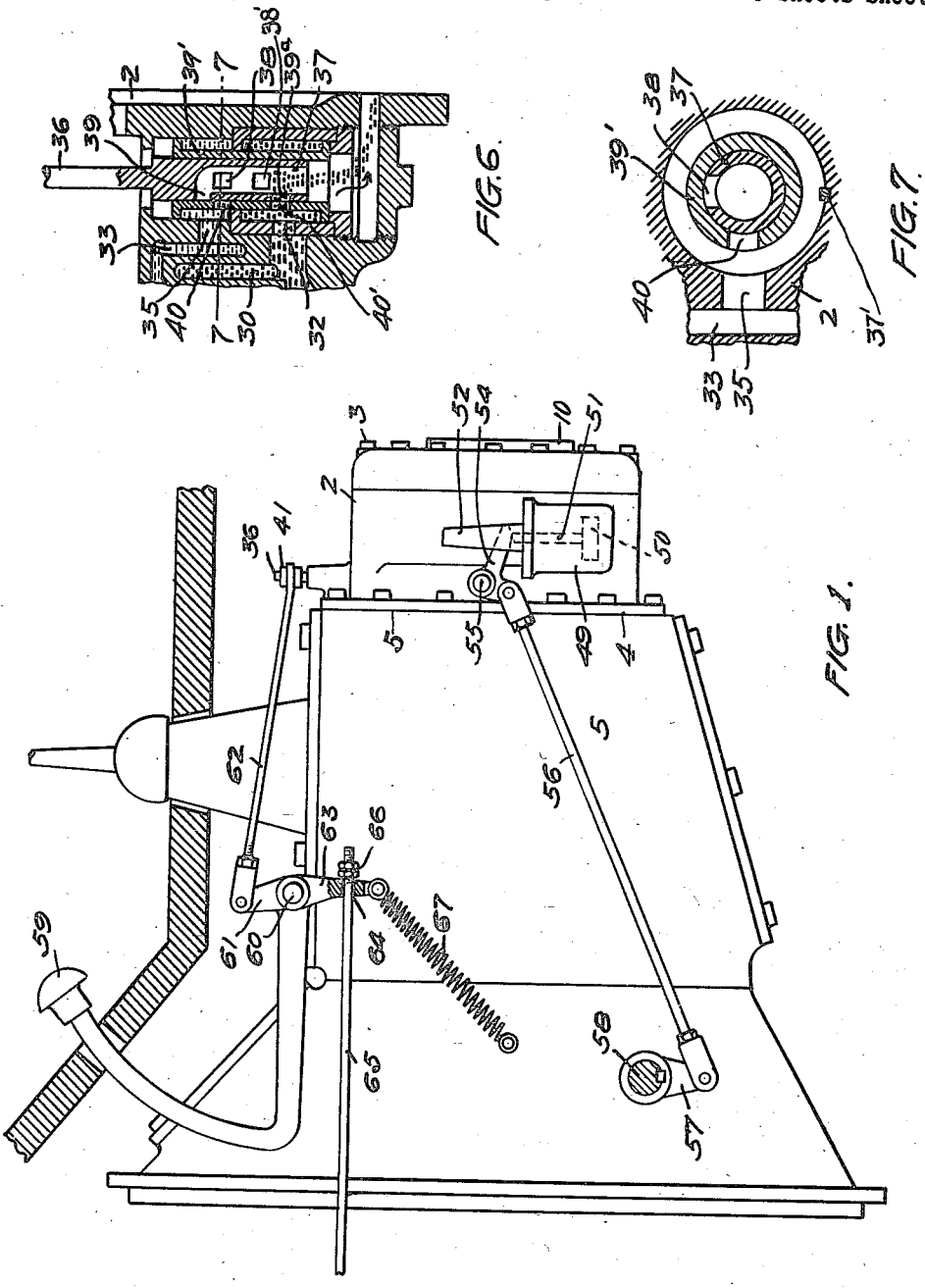
INVENTOR
EDWIN G. STAUDE
BY Paul Paul
ATTORNEYS

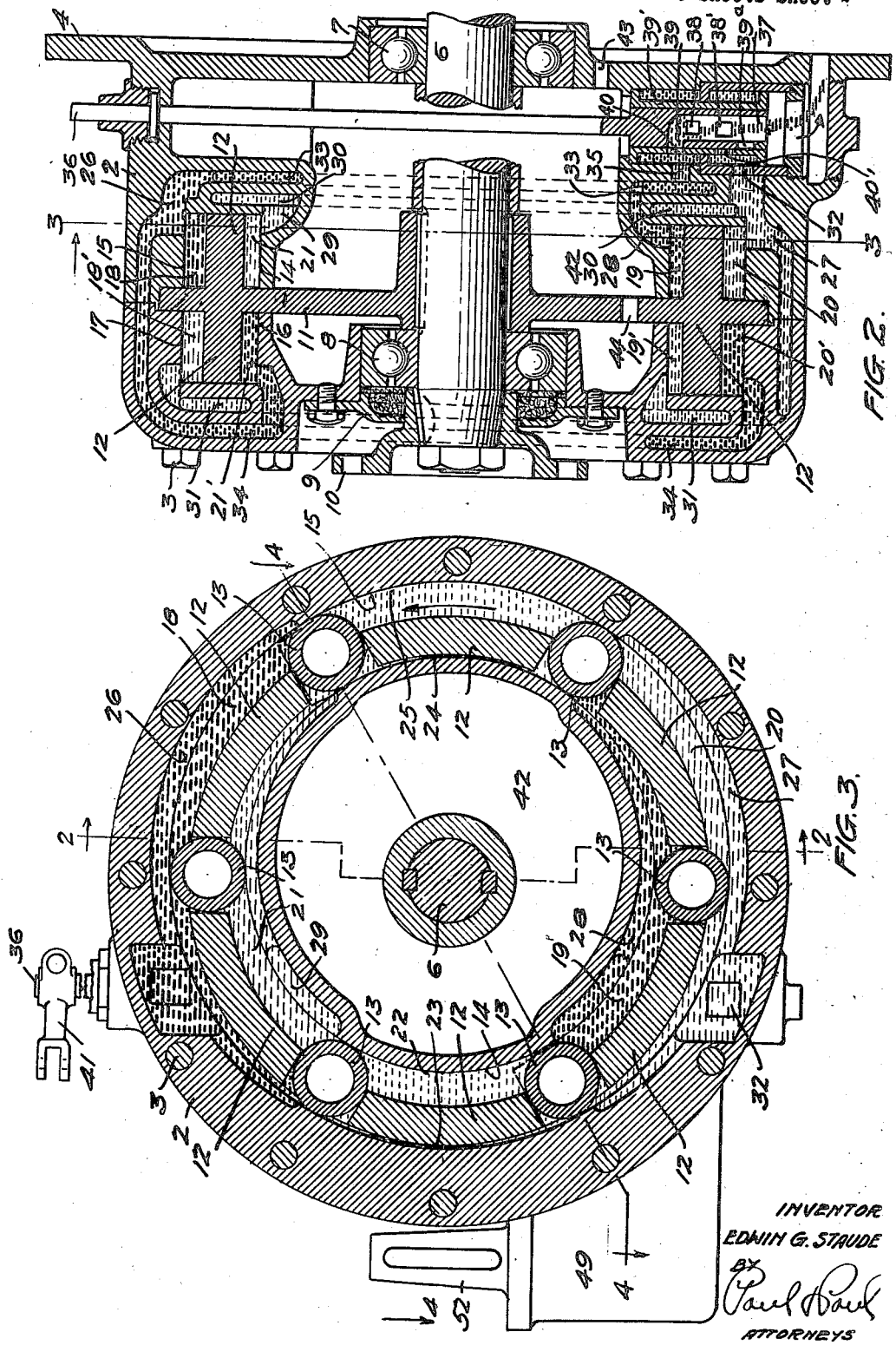

Nov. 11, 1924.

E. G. STAUDE 1,514,804

FLUID ACTUATED BRAKE FOR MOTOR VEHICLES

Original Filed Sept. 17, 1920   3 Sheets-Sheet 3

INVENTOR
EDWIN G. STAUDE
BY
Paul & Paul
ATTORNEYS

Patented Nov. 11, 1924.

1,514,804

UNITED STATES PATENT OFFICE.

EDWIN G. STAUDE, OF MINNEAPOLIS, MINNESOTA.

FLUID-ACTUATED BRAKE FOR MOTOR VEHICLES.

Application filed September 17, 1920, Serial No. 410,957. Renewed September 22, 1924.

*To all whom it may concern:*

Be it known that I, EDWIN G. STAUDE, a citizen of the United States, resident of Minneapolis, county of Hennepin, State of Minnesota, have invented certain new and useful Improvements in Fluid-Actuated Brakes for Motor Vehicles, of which the following is a specification.

This invention relates to improvements in fluid actuated mechanism for controlling the speed of rotating shafts, particularly the driving or transmission shafts of power propelled vehicles. The mechanism disclosed herein is of the same general character as that described and claimed in my Patent #1,470,701 dated October 16, 1923, re-issued August 26, 1924, #15,906.

One of the objects of my present invention is to provide mechanism which will operate the same and have the same speed controlling action when the direction of rotation of the operating shaft is reversed as it does when the shaft is turning in its usual or normal direction; or, when the device is applied to a motor vehicle, will act the same whether the vehicle is moving forward or backward.

Another object of the invention is to provide a speed controlling mechanism that can be applied through the transmission shaft of a motor vehicle so as to control the speed of the vehicle wholly through the speed of said transmission shaft, or through said transmission shaft in conjunction with friction brakes applied to the vehicle driving wheels and operated from the shaft controlling mechanism or independently thereof.

Another object of the invention is to provide a device of this class with radially moving cylindrical piston elements whereby its pumping capacity and effectiveness will be largely increased.

Another object of the invention is to provide a fluid operated controlling device that is adapted to run free, or without any circulation of the contained fluid, when control of the shaft is not required, provision being made for suitable lubrication during such running condition.
Other objects of the invention will appear from the following detailed description.

The invention consists generally in various constructions and combinations, all as hereinafter described and particularly pointed out in the claims.

Figure 5:
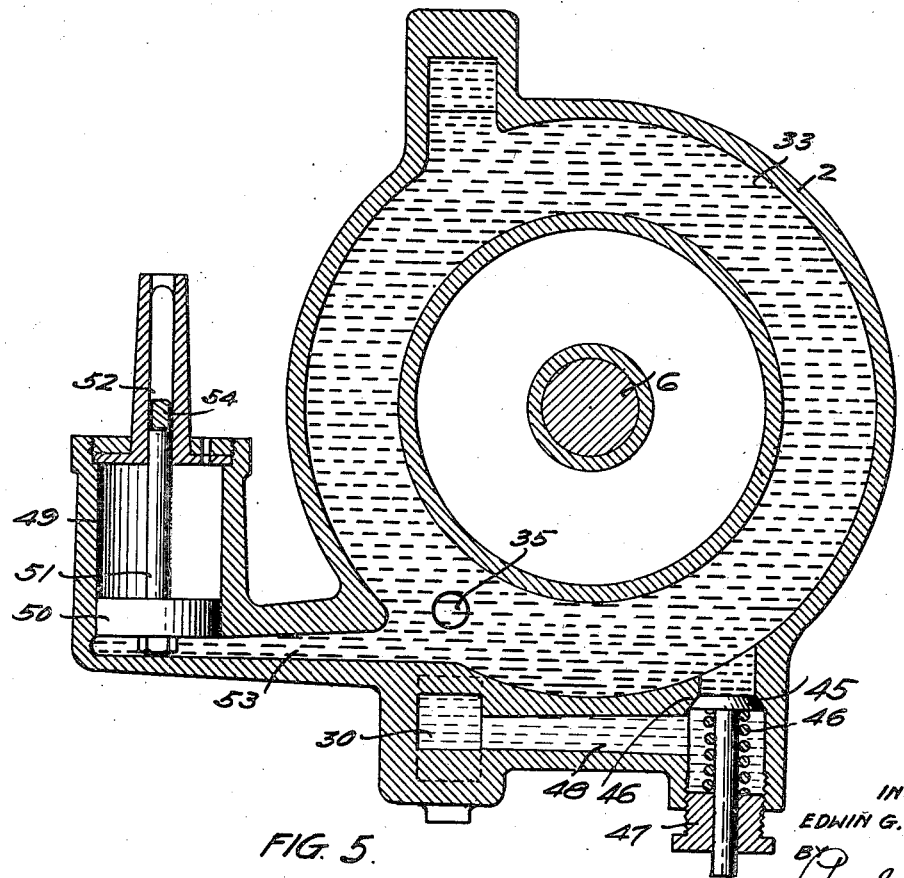

In the accompanying drawings forming part of this specification,

Figure 1 is a side view of an automobile transmission case embodying my invention, Figure 2 is a vertical sectional view, substantially on line 2—2 of Figure 3 looking in the direction of the arrow with the parts broken away, showing the position of the controlling valve, Figure 3 is a vertical sectional view on the line 3—3 of Figure 2, looking in the direction of the arrow, Figure 4 is a sectional view on the line 4—4 of Figure 3, looking in the direction of the arrow, Figure 5 is a vertical sectional view on the line 5—5 of Figure 4, looking in the direction of the arrow,

Figure 6 is a detail sectional view, of the valve showing the position of the parts to adapt the vehicle for moving backward, Figure 7 is a sectional view on the line 7—7 of Figure 6.

In the drawings, 2 represents a suitable pump housing, made preferably in two parts secured together by suitable means such as bolts 3. One face of the housing is preferably provided with a flange 4 adapted to be secured by suitable means to the transmission case 5. The main motor or transmission shaft 6 extends through the housing and is supported by bearings 7 and 8 suitably arranged in said housing, (Figures 2 and 4). A dust cap 9 is preferably provided over the bearing 8, and the end of the shaft 6 may be provided with a coupling 10.

Upon the shaft 6, between the bearings 7 and 8, I provide a rotor or disk 11 having laterally projecting wings or sectors 12, with gaps or openings between them to receive roller pistons 13, said rollers being preferably made hollow to reduce weight and free to move radially toward and from the center of the rotor between said wings or sectors, (Figure 3).

The wings 12 project laterally from the sides of the disk 11 into annular chambers formed in the housing 2, said chambers being provided with intake and exhaust ports extending through the walls of the housing as hereinafter described.

In order to balance the pressure on both sides of the rotor, I preferably provide double chambers in the housing, wings or sectors 12 projecting from each side of the disk, and rollers 13 in each of said chambers, said rollers acting as the pistons of the pump. This arrangement in effect provides a double pump with equal pressure on both sides of the disk, which arrangement balances the disk and eliminates friction. If preferred, however, a single chamber may be provided with the sectors and rollers arranged on one side of the disk only.

To secure a pumping action with the rollers 13, as the disk is rotated and the rollers are moved around in the annular chamber, I provide cam surfaces 14 and 15, oppositely arranged, compelling a radial movement of the rollers as they travel along in the pump chamber.

To balance the pressure against the bearings of the rotor, I provide a second pair of cam surfaces 16 and 17 arranged opposite to balance the pressure against cam surfaces 14 and 15.

Referring now to Figure 3 it will be noted that when the rotor revolves toward the left or in the direction indicated by the arrows, the fluid in the pockets 18, 19, 20' and 21' will be subjected to pressure and the fluid will be drawn into the pockets 20, 21, 18' and 19'.

In the drawings, I have indicated the pressure side of my pump device by heavy lines and the suction side by light lines. The so-called fluid pressure seal is at opposite ends of the stroke at the points marked 22, 23, 24 and 25. It is evident from the construction shown that with the revolution of the rollers 13, fluid will be drawn in behind the rollers and forced out in front of them. The ports for the intake and exhaust in my improved pump are indicated at 26, 27, 28 and 29 and since the operation of the rollers on each side of the disc is the same except that the intake and exhaust ports are reversed, I will proceed to describe the movement of the rollers with respect only to the cam surfaces 14 and 15.

For the purpose of connecting all the exhaust ports in one chamber and the intake ports in another, I provide annular spaces 30 and 31 connected with all the intake ports and also with the intake passage 32. Similar spaces 33 and 34 communicate with the exhaust and in turn are connected with the exhaust port 35. For controlling the flow of fluid through the ports, I provide a valve stem 36 to which I secure a valve 37 having an intake opening 38' and 39<sup>a</sup> for regulating the inflow and exhaust or outlet openings 38 and 39. A slidable sleeve 39' has ports 40 and 40', which communicate respectively with the ports 38 and 39 and 38' and 39a when the valve and sleeve are adjusted.

From the foregoing description it will be apparent that when the intake valve port 38 is closed, the exhaust valve port 39 must be open. As the valve stem 36 is rotated through the movement of the arm 41 (see Figure 3) the intake port 38 will be opened and the exhaust port closed and when the arm 41 is moved to the extreme position, the valve will be opened, allowing the fluid to enter freely and the exhaust port 39 being closed, the escape of the liquid will be prevented and the liquid, being non-compressible, the rotor will be effectively braked and being rigidly connected with the propeller shaft, will effectively check the revolution of the drive wheels. As soon as the exhaust port is opened, the liquid will flow out of the rotor chamber and the intake port being closed, the fluid can not re-enter the chamber and the rotor will be free to revolve with the movement of the machine and be practically clear of the circulating fluid except for such as may be left for purposes of lubrication. The fluid entering the intake port 32 flows from the bottom of the transmission and as the fluid is discharged through the port 35, it flows back into the transmission. By closing the intake port when the device is in use, I eliminate the necessity of circulating the fluid, the danger of foaming being prevented by providing an opening 43 above the oil line in the transmission case, so that the fluid may drain back therein. I also prefer to provide a hole 44 in the disc to allow the fluid to flow from one side to the other thereof.

A by-pass valve 45 is provided, held in position by a spring 46 and adjustable by means of a plug 47. This valve is adapted to fit the seat to retain the fluid in the annular chamber 33, which communicates with all of the exhaust ports. Should the pressure exceed the degree for which the valve is adjusted, the valve will be forced open against the tension of the spring 46' and communicate through a passage 48 with the inlet port. By the adjustment of the plug 47 I am able to limit the degree of the exhaust pressure and consequently the braking action of the device.

From an examination of Figures 2 and 6 it will be noted that the sleeve 39' in which the valve 37 is mounted to rotate has flanged ends and is adapted to move vertically under pressure of the fluid against the said flanged ends, the raised position being indicated in Figure 2 and the depressed position of the sleeve being indicated in Figure 6.

In Figure 2 the non-elastic fluid is shown flowing outwardly from the pump or rotor casing through the exhaust port 35, the intake port 32 being closed and the pump or rotor moving forward and expelling the liquid and running freely in the casing.

In Figure 6 the reversing of the driving mechanism to back the vehicle has reversed the direction of movement of the pump and the liquid flowing through the port 32 and engaging the lower flanged end of the sleeve 39' has moved this sleeve downwardly to the limit of its lower movement, as indicated in Figure 6. This movement of the sleeve closes the port 39, shown open in Figure 2, and shuts off the flow of fluid through the port 35. The downward movement of the sleeve opens the port 40' by putting it in register with the port 32 and thereupon the flow of fluid will be outwardly through the port 32 and the ports 40' and 40, while the motor is running on reverse and the machine moving backward. As soon, however, as the motor begins to run forward and changes the direction of movement of the pump, the fluid flowing through the port 35 will engage the upper flange of the sleeve 39' and raise it to the position shown in Figure 2, closing the port 40' and opening the port 40 to the exhaust port 35. Thereupon the flow of fluid outwardly through the valve will be resumed, as indicated in Figure 2. In this way I am able to utilize the device for forward and backward movement of the vehicle. Evidently if there was no provision for causing the fluid to flow outwardly through the port 32 when the machine was reversed, the pump would be locked and with it the propelling mechanism. With the device described, however, this difficulty is avoided and the fluid may be discharged from the pumping chamber to allow for the forward or backward drive with equal facility. As described, the sleeve is free to slide vertically but is held against rotation by means of a suitable key 37'.

To disengage the clutch when the brake is operated, I provide a small cylinder 49 in which a piston 50 operates, provided with a rod 51 adapted to move in a suitable guide 52. The cylinder 49 is connected with the pressure chamber 33 by means of a port 53 and when a pressure is generated on the exhaust side of the motor, it will immediately be applied to the piston 50 to actuate the rod 51. A bell crank 54 pivoted at 55 has one arm adapted to rest on the piston rod 51 and its other arm connected to one end of an adjustable rod 56. The other end of the rod 56 is attached to a depending arm 57 mounted on a rock shaft 58 which ordinarily is used for controlling the clutch. As the piston rod 51 rises, the bell crank 54 is rocked, moving the rod 56 and rocking the depending arm 57 and the shaft 58 and disengaging the clutch. When the pressure is released on the piston, the clutch spring will return it to its normal position.

When the pressure chamber 33 is in communication with the cylinder 49 for releasing the clutch, an automatic slide valve suitably positioned in port 53 at the junction between said chambers 30 and 33 and port 53 will close communication between that port and chamber 30; and when the vehicle is backed said valve will automatically close communication between port 53 and chamber 33 and open communication between chamber 30 and said port, the valve being shifted by suction in one of said chambers and compression in the other as will be obvious to the skilled mechanic.

For the purpose of operating the valve stem 36 through the movement of the accelerator, I have shown in Figure 1 the accelerator 59 pivoted at 60 and having an arm 61 pivotally connected with a rod 62 at one end, the other end of said rod being attached to the arm 41. Evidently, when the accelerator is depressed, the arm 41 will be operated to rotate the valve stem and the controlling valve.

It will be seen that the piston 50 and the piston rod 51 are not affected by the direction of rotation of the transmission shaft 6, and the pump disc actuated therefrom, but that with an increase of pressure this piston and piston rod will be actuated in exactly the same way regardless of whether, when the device is used on a motor vehicle, the vehicle is running forward or backward.

I have illustrated and described an arrangement of a bell crank lever 54 having one arm resting upon the piston rod 51 and adapted to disengage the clutch of the motor vehicle when the rod 51 is moved through the action of the rotor, as hereinbefore explained. It will be obvious, however, that, as the action of the piston 50 and piston rod 51 is always the same, whether the motor vehicle is being driven forward or backward, it will be entirely practicable to operate other devices than the clutch from this piston and piston rod.

If it is preferred to use friction brakes in addition to the controlling or braking action applied to the transmission shaft 6, such brakes may be operated in conjunction with, or separately from, the operation of the clutch from said piston 50 and piston rod 51.

The accelerator lever is provided on the opposite side of its pivot from the arm 61 with a depending arm 63 having a hole 64 therein to receive a rod 65 that is connected with the control of the carburetor in the ordinary way. Adjusting nuts 66 are mounted on the rod 65 and these nuts are placed in such position that normally the accelerator will operate the carburetor control rod in the usual manner, the arm 63 pressing against the nuts 66. When the accelerator 59 reaches its normal return stroke and cuts off the gas in the carburetor, it will have rocked the valve stem 36 but the valve is so adjusted that the intake port will remain closed and the outlet port 35 will remain open when the accelerator 59 has returned to its normal position and the gas is shut off and the motor is idle. A further movement of the accelerator will not affect the position of the rod 62, although the valve stem 36 will continue to rotate. At this point, where the carburetor is throttled, the port 39 will begin to close and the port 38 open, so that by the time the accelerator has returned to the limit of its upward movement, it will have entirely closed the port 35 and opened the intake port 32.

From the foregoing description it will be understood that the brake can not be applied when the motor is working and the clutch connected, as the movement of the accelerator will shut off the gas through the carburetor before the brake device is rendered effective and at the point where the gas is shut off and the brake is not applied the car may coast without any obstruction by the brake. As soon, however, as the accelerator is allowed a further upward movement, the rotor will set up a pressure which will disengage the clutch and the motor and apply the brake through the closing of the exhause port and the resistance of the fluid to the revolution of the rotor therein. A spring 67 connected with the arm 63 normally tends to hold the accelerator in its raised position. It is necessary for the operator to keep his foot on the accelerator at all times to control the car and whenever the foot is removed, the spring 67 will automatically apply the brake, disengage the clutch and immediately stop the car. This feature of the invention I regard as of great importance, as an inexperienced driver, becoming confused in a crowded street, would be almost sure to remove his foot from the accelerator and in so doing the mechanism described would automatically stop the car. The connection of the control rod 62 with the accelerator also makes it possible to drive the car with perfect control.

I claim as my invention:

1. A fluid operated brake for motor vehicles comprising a casing having inlet and exhaust ports for admitting and discharging a non-elastic fluid, a rotor mounted in said casing and connected with the vehicle propeller shaft, said rotor having means connected to opposite sides thereof for drawing the fluid into said casing and expelling it therefrom and a valve mounted to check the flow of liquid from said casing.

2. A fluid brake for motor vehicles comprising a casing having a circulating chamber for a non-elastic fluid, and intake and exhaust ports communicating with said chamber, a rotor mounted to revolve in said chamber and having radially moving means at opposite sides thereof for admitting and shutting off the flow of the fluid through said chamber, and a valve mounted to regulate the flow of fluid to and from said chamber.

3. The combination, with a vehicle propeller shaft, of a pump for a non-elastic fluid connected therewith and provided with intake and exhaust ports, a valve for controlling the flow of fluid through said ports for checking or releasing said pump, and mechanism including clutch operating means actuated through the pressure of the liquid when said exhaust port is closed for disengaging a clutch.

4. The combination, with a propeller shaft, of a non-elastic fluid pump connected therewith and having intake and exhaust ports, a valve for regulating the flow of the non-elastic fluid through said ports, a carburetor control rod, and accelerator lever connected therewith and means connecting said accelerator lever with said valve to insure the shutting off of the gas to the carburetor prior to the movement of said valve to obstruct the flow of fluid.

5. The combination, with a vehicle propeller shaft, of a rotary non-elastic fluid pump including radially moving parts supported from opposite sides of a rotor operatively connected with said shaft and means for checking the flow of fluid from said pump to retard or stop the revolution of said shaft.

6. The combination, with a vehicle propeller shaft, of a rotary non-elastic fluid pump connected therewith and including radially moving rotatable elements and cam surfaces co-operating therewith for causing the circulation of the fluid through said pump, and means for checking the exit of the fluid to retard or stop the revolution of said shaft.

7. The combination, with a vehicle propeller shaft, of a casing having a circulating chamber for a non-elastic fluid and provided with cam surfaces, a rotor having radially moving rotatable elements co-operating with said cam surfaces for forcing the fluid through said chamber, and means at the exit of said chamber for checking the flow of fluid therefrom and retarding or stopping the revolution of said shaft.

8. The combination, with a vehicle propeller shaft, of a pump for a non-elastic fluid connected therewith, means for checking the flow of fluid from said pump to retard or stop the revolution of said shaft, clutch operating means, and means actuated through the checking of the flow of fluid for operating the clutch operating means.

9. The combination, with a vehicle propeller shaft, of a pump for a non-elastic fluid connected therewith, means for interrupting the flow of fluid from said pump to retard or stop the revolution of said shaft, a piston actuated by the pressure of the fluid when its flow is checked, and means operated by the movement of said piston for disengaging the clutch.

10. The combination, with a vehicle propeller shaft, of a pump casing having intake and exhaust openings and a rotating piston comprising a rotor having radially movable rollers supported from opposite sides thereof and connected with said shaft, means for checking the flow of fluid through said exhaust opening to retard or stop the revolution of said shaft, and means actuated by the pressure of the fluid upon backward movement of the vehicle for reversing the normal flow of the fluid through said ports.

11. The combination, with a vehicle propeller shaft, of a non-elastic fluid pump connected therewith and provided with intake and exhaust ports, a valve for retarding or stopping the flow of inelastic fluid through said exhaust port for controlling the revolution of said shaft, and a sleeve encircling said valve and movable longitudinally thereof for reversing the normal direction of flow of fluid through said valve to adapt the device for backward movement of the vehicle.

12. The combination, with a vehicle propeller shaft, of a non-elastic fluid pump connected therewith and having intake and exhaust ports, a valve for controlling the flow of non-elastic fluid through said pump to retard or stop the revolution of said shaft, said valve having ports therein and a flange sleeve also having ports and movable lengthwise of said valve, with its ports adapted to register with the ports in said valve for reversing the direction of flow of the liquid through said pump when said vehicle is running backward.

13. The combination, with a vehicle transmission, of a non-elastic fluid pump connected therewith, means for retarding or stopping the flow of inelastic fluid through said pump to check or stop said transmission, and an accelerator connected with said means and with the carburetor control.

14. The combination, with a motor driven vehicle transmission, of a non-elastic fluid pump connected therewith, a valve for checking the flow of fluid through said pump to retard or stop said transmission, an accelerator lever connected with said valve on one side of the pivot of said lever and with the carburetor control on the opposite side of said pivot, and a spring for normally holding said accelerator lever in its raised position.

15. The combination with a propeller shaft, of a casing having a fluid circulating chamber, a rotor connected to the shaft and provided with radially movable rollers operating to exert on a fluid an expelling force in front and a suction force at the rear of the rollers, intake and exhaust ports for the fluid, and valve controlling means for the ports.

16. The combination with a propeller shaft, of a casing having a fluid circulating chamber, a rotor connected to the shaft and provided with a laterally extending sector, rollers mounted for radial movement in openings formed in the sector and acting as expelling and suction pistons on fluid above and below the sector, intake and exhaust ports for the fluid, and valve controlling means for the ports.

17. The combination with a propeller shaft, of a fluid circulating chamber, a rotor connected to the shaft and provided with a laterally extending sector, rollers mounted for radial movement in openings formed in the sector and acting as expelling and suction pistons on fluid above and below the sector, cams for moving the rollers radially, intake and exhaust ports for the fluid, and valve controlling means for the ports.

18. Mechanism for controlling the speed of a rotating shaft comprising a pump having a rotor and intake and exhaust ports, means for checking the flow of the fluid through said exhaust port to retard or stop said pump, and means actuated by the pressure of the fluid upon backward movement of the rotor, for reversing the normal flow of the fluid through said ports.

19. A hydraulic brake for motor vehicles comprising an inelastic fluid pump having a rotor and intake and exhaust ports, means for checking the flow of fluid through said exhaust port to retard or stop the revolution of said rotor and reciprocating means actuated by the pressure of the fluid upon backward movement of said rotor for reversing the normal flow of the fluid through said ports.

20. The combination with a vehicle propeller shaft, of an inelastic fluid pump having a rotor connected with said shaft and provided with intake and exhaust ports, means for controlling the flow of fluid through said pump, said means having ports therein, and means actuated by the fluid pressure and having ports adapted to register with the ports of said controlling means for reversing the direction of flow of the fluid through said pump when the vehicle is running backward.

21. In a hydraulic brake for motor vehicles, a fluid pump having a rotor with radially moving rotary piston elements and inner and outer chambers, the outer exhaust chamber being adjacent the inner intake chamber and the outer intake chamber being adjacent the inner exhaust chamber, thereby balancing the radial pressure upon the axis of said rotor, and means for controlling the flow of fluid from the exhaust side of said pump.

22. The combination with a motor vehicle controlling means, of a pump having intake and exhaust ports, and means for controlling the flow of inelastic fluid from said exhaust port, a cylinder having a piston connected with the vehicle controlling means, and means for directing the fluid against said piston during the forward or backward movement of said pump.

23. A speed controlling mechanism for motor vehicles comprising a pump and a fluid circulating system, a valve for controlling the flow of the fluid in said circulating system to cause pressure on the exhaust side of the pump, means for controlling said valve, a cylinder having a piston for actuating a moving part of the motor vehicle, and means for continuing the normal action of the fluid against the piston, regardless of the direction of rotation of the pump.

24. In a hydraulic brake for motor vehicles, the combination of a non-elastic fluid pump, comprising a rotor having radially moving elements, means for balancing the radial pressure on the axis of the rotor and increasing the capacity of the pump, means for controlling the flow of the fluid from the exhaust side of said pump for the purpose specified.

25. In a hydraulic brake for motor vehicles, comprising a pump having intake and exhaust ports, means for controlling the flow of fluid from said exhaust port, a cylinder having a piston for operating one of the controls of the motor vehicle, and means for continuing the normal action of the fluid against the piston, regardless of the direction of rotation of the pump.

26. In a hydraulic brake for motor vehicles, comprising a pump mounted on the transmission shaft and having a fluid circulating system, the valve connected with one of the foot pedals of the motor vehicle to control the speed of the fluid in said circulating system, a cylinder having a piston adapted to operate one of the motor vehicle controls, and means for continuing the normal action of the fluid against the piston, regardless of the direction of rotation of the pump rotor.

27. A combination with the transmission shaft of a motor vehicle, comprising a pump and a cylinder having a piston adapted to operate one of the motor vehicle controls, said piston being actuated by fluid from the exhaust side of the pump, a valve for controlling the pressure of said fluid to said cylinder, a by-pass for limiting the maximum pressure on the exhaust side of said pump, and means for continuing a normal action of fluid against the piston, regardless of the direction of rotation of the pump rotor.

In witness whereof, I have hereunto set my hand this 9th day of September, 1920.

EDWIN G. STAUDE.